United States Patent
Kipnis et al.

[15] 3,688,554
[45] Sept. 5, 1972

[54] APPARATUS FOR TESTING MANOMETRIC INSTRUMENTS

[72] Inventors: Aron Mikhailovich Kipnis, Leningradsky prospekt, 28, kv. 14; Stella Mikhailovna Kesselman, ulitsa Dzerzhinskogo, 1/19, kv. 16, both of Moscow, U.S.S.R.

[22] Filed: June 17, 1971

[21] Appl. No.: 153,973

[52] U.S. Cl. .................................................73/4 R
[51] Int. Cl. .............................................G01l 27/00
[58] Field of Search .................................73/4 R, 168

[56] References Cited

FOREIGN PATENTS OR APPLICATIONS 195,170   4/1967   U.S.S.R. ........................73/4 R

*Primary Examiner*—S. Clement Swisher
*Attorney*—Eric H. Waters et al.

[57] ABSTRACT

An apparatus for testing fluid pressure relays providing an air-pressure output signal in response to an air pressure input signal, including an input pressure generator, a pair of pressure-responsive members connected through a balanced arm and reproducing in association with this arm the rated value of the transformation factor of the manometric instrument under testing; and the indicator of the position on the balanced arm, comprising a movable member carried by this balanced arm and a stationary member mounted in opposition to the movable member. The apparatus further comprisis a power output member pneumatically connected with the indicator of the position of the balanced arm and operatively associated through a pivoted arm with this balanced arm, and a double-channel recording device.

The apparatus provides for testing and gauging manometric instruments with the testing error up to 0.1 percent it also records continuous diagrams of the errors of these instruments and the values of the output pressure thereof on the moving record tape of the secondary double-channel recording device.

3 Claims, 3 Drawing Figures

APPARATUS FOR TESTING MANOMETRIC INSTRUMENTS

The invention relates to standard apparatus for testing air-pressure operated instruments, and, more particularly, it relates to apparatus for testing manometric instruments with air-pressure output signals.

Known in the prior art are apparatus for testing manometric instruments with air-pressure, e.g., air pressure output signals, wherein the air-pressure signal of the generator of input pressure, variable according to a predetermined law or pattern, is supplied to the input of the manometric instrument under testing and to a first pressure-responsive member of the apparatus, this pressure-responsive member being mechanically connected through a balanced pivoted arm to a second pressure-responsive member of the apparatus, receiving the output air-pressure signal from the instrument under testing, the deviations of the balanced arm from its zero position being representative of the value of an error of the manometric instrument under testing.

In these prior art testing apparatus the error of the manometric instrument under testing is read by the operator on the calibrated dial of a pointer-type instrument. The value of the output signal and the corresponding value of the error are not indicated. Moreover, the above structure of the apparatus for testing manometric instruments is practically uncapable of dealing with manometric instruments of which the error is below 0.3 percent to 0.5 percent.

It is an object of the present invention to provide an apparatus for testing manometric instruments with an air-pressure output signal, providing for the recording of an error of the manometric instrument under testing and of the output signal thereof throughout the testing operation.

It is another object of the present invention to provide an apparatus for testing manometric instruments with an air-pressure output signal, incorporating means for selective disconnection of the apparatus at the end of a testing cycle.

It is still another object of the present invention to provide an apparatus for testing manometric instruments with an air-pressure output signal, capable of performing a succession of testing cycles.

It is a further object of the present invention to provide an apparatus for testing manometric instruments with an air-pressure output signal, providing for the increase of the accuracy of such testing.

With these and other objects, in view, the invention resides in an apparatus for testing manometric instruments with an air-pressure output signal, wherein the air-pressure signal of an input-pressure generator, variable in accordance with a pre-determined pattern, is supplied to the input of the manometric instrument under testing and to a first pressure-responsive member of said apparatus, said first pressure-responsive member being operatively associated through a balanced pivoted arm with a second pressure-responsive member of said apparatus, connected to receive the output air-pressure signal of said manometric instrument under testing, the deviations of said balanced arm from its zero position being representative of the value of an error of said manometric instrument under testing, in which apparatus, in accordance with the present invention, there is provided an indicator of the position of said balanced arm, including a movable member carried by said balanced arm and a stationary member mounted in opposition to said movable member, said apparatus further including a power output member pneumatically connected with said indicator of the position of said balanced arm and operatively associated through a pivoted arm with said balanced arm; said apparatus also including a secondary two-channel recording device, the first one of the channels of said recording device receiving an air-pressure signal from said indicator of the position of said balanced arm, representative of the value of an error of said manometric instrument under testing, the other one of said channels of said recording device being connected to receive the output air-pressure signal of said manometric instrument under testing.

It is advisable for said movable member of said indicator of the position of said balanced arm to be in the form of a choke, and for said stationary member of said indicator to be in the form of a jet nozzle.

Said power output member of the apparatus may be in the form of a bellows.

The structure of the apparatus embodying the present invention provides for testing manometric instruments with an air-pressure output signal with the testing accuracy of about 0.1 percent, and for continuous recording of the diagrams of the error value and of the output signal of the manometric instrument under testing on the moving record tape of said secondary two-channel recording device.

The present invention will be further described in connection with an embodiment thereof, with reference to the accompanying drawings, wherein.

Figure 1:
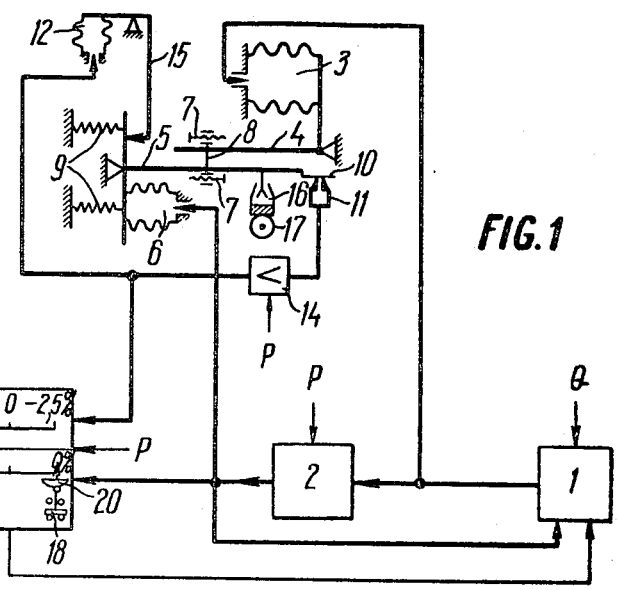
FIG. 1 illustrates a general schematic diagram of an apparatus for testing manometric instruments, constructed in accordance with the invention.

Referring now in particular to the appended drawings, an apparatus for testing the performance of manometric instruments with an air-pressure output signal, constructed in accordance with the present invention, comprises a generator 1 (FIG. 1) adapted to produce input air pressure variable in accordance with a predetermined law or pattern. The input pressure generator 1 is pneumatically connected with a manometric instrument 2 under testing and with a first pressure-responsive member of the apparatus, which pressure-responsive member in the herein described embodiment is in the form of a bellows 3.

The bellows 3 is operatively associated through a pivoted arm 4 and a balanced pivoted arm 5 to a second pressure-responsive member of the apparatus - with a second bellows 6 in the herein described embodiment, the bellows 6 being pneumatically connected to the instrument 2 under testing. The pivoted arms 4 and 5 are interconnected by means of a pair of micrometer screws 7 and a connection tape 8. The balanced arm 5 is maintained in its zero position with the help of springs 9.

The ratio between the effective area of the bellows 3 and that of the bellows 6 is chosen so that, when multiplied by the transmission ratio of the arms 4 and 5 (i.e., on the ratio of mechanical transmission of motion from the bellows 3 to the bellows 6), it should equal the rated transformation factor of the manometric instrument 2 under testing. Under the term "transformation factor" it is understood the ratio between the range of the rated output signals of the instrument under testing and the range of the input pressure signals thereof.

The precise reproduction of the rated value of the transformation factor of the instrument under testing is effected in the present apparatus with the help of the two micrometer screws 7 operable to displace the connection tape 8.

The present apparatus further comprises a position indicator associated with the balanced arm 5, the indicator being made up by a movable member — in the present embodiment a choke or closure 10 carried by the balanced arm 5 and a stationary member — a jet nozzle 11 mounted in opposition to the choke 10.

Besides, the present apparatus embodying the present invention comprises a power output member — in the described embodiment a power output bellows 12, and a secondary two-channel recording instrument 13. The bellows 12 is pneumatically connected through a pneumatic amplifier 14 to the nozzle 11 and is operatively associated through a pivoted arm 15 with the balance arm 5. One of the two recording channels of the secondary double-channel registration instrument 13 is pneumatically connected to the nozzle 11 through the pneumatic amplifier 14, whereas the other channel thereof is connected to the output of the manometric instrument 2 under testing.

The ratio between the effective area of the bellows 6 and that of the bellows 12 is chosen so that, when multiplied by the mechanical ratio of the $f$ arms 5 and 15, i.e., by the ratio of the mechanical transmission of motion from the bellows 6 to the bellows 12, it should provide for variation of the output signal of the pneumatic amplifier 14 within a 0.2 kg/sq.cm – 1.0 kg/sq.cm range in response to the variation of the pressure supplied to the bellows 6, equal to 5 percent of the range of the variation of the value of the output pressure signal of the instrument 2 under testing.

The common practice being recording both a positive error and a negative one, the springs 9 are originally adjusted for the initial position of the balanced arm 5 to be such that the output pressure signal of the pneumatic amplifier 14 should correspond to the middle of the range of the variation of the input signal of the secondary recording instrument 13, i.e., should be equal to 0.6 kg/sq.cm. When the above condition is ensured, error recording can be effected within the limits of ±2.5 percent of the uppermost value of the output signal of the instrument 2 under testing.

In order to provide for zero adjustments, the balanced arm 5 has attached thereto a weight 16 associated with an adjustment cam 17.

For the present apparatus to be able to operate automatically, the pressure output of the instrument 2 under testing is pneumatically connected to the generator 1 of input pressure.

In addition to the abovedescribed pneumatic connections which are illustrated with thick solid lines in the appended drawings, the apparatus embodying the present invention also has electric connections.

Thus, the double-channel sedondary recording instrument 13 incorporates a pair of limit switches 18 and 19 which are electrically connected with the control circuit of the input pressure generator 1.

These limit switches 18 and 19 are associated with the mechanism (not shown in the drawings) actuating the recording stylus 20 adapted to draw a curve representing the variation of the output air-pressure signal of the manometric instrument 2 under testing, so that when the stylus 20 is actuated into a position corresponding to the "zero" value of this output signal (i.e., to 0.2 kg/sq.cm) the limit switch 18 should be operated, and when the stylus 20 is actuated into a position corresponding to the uppermost value of this output signal (i.e., to 1.0 kg/sq.cm) — the limit switch 19 should be operated.

Figure 2:
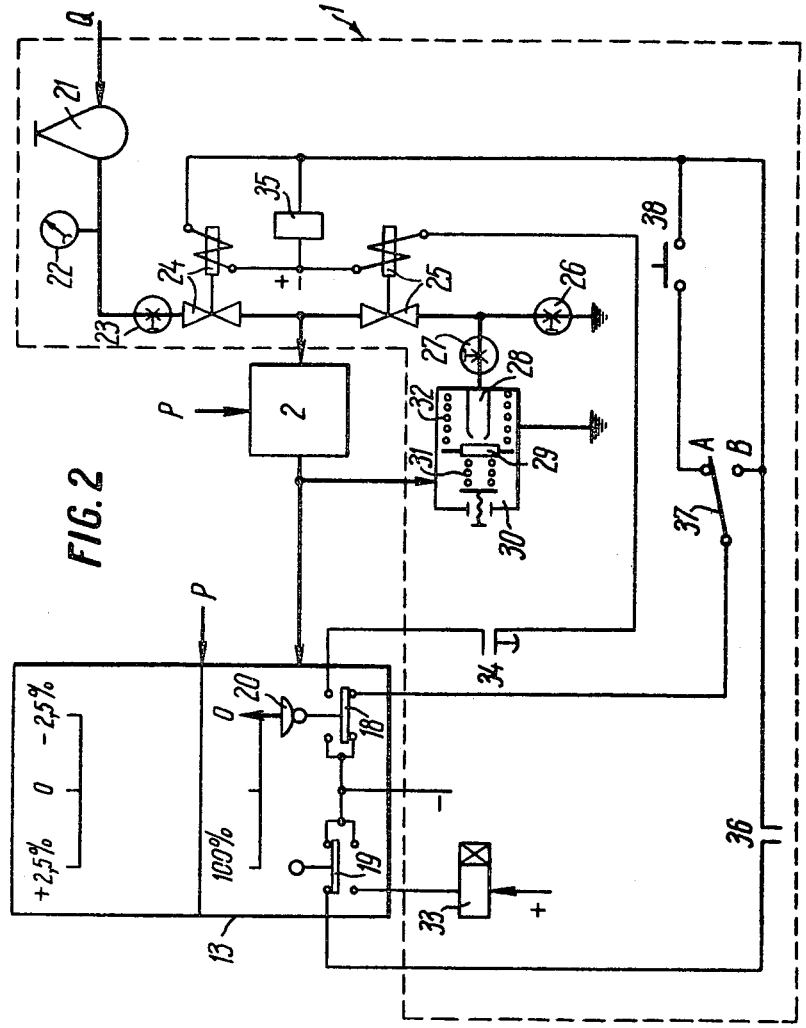
FIG. 2 illustrates a general schematic diagram of an input pressure generator, together with a secondary two-channel recording device in an apparatus for testing manometric instruments, constructed in accordance with the invention.

The structure of the input pressure generator 1 is schematically illustrated in the FIG. 2 depicting the pneumatic and the electric circuitry of this generator.

The pneumatic part of the input pressure generator 1 includes a pressure reducer 21 connected with a pressure gauge 22 and an adjustable throttle valve 23. The latter is connected to a solenoid-operated valve 24 of which the output is connected with the input of the manometric instrument 2 under testing and with another solenoid-operated valve 25. The last-mentioned solenoid-operated valve 25 is connected to ambient atmosphere via an adjustable throttle valve 26. In addition, the valve 25 is further connected to the ambient atmosphere via another adjustable throttle valve 27 and a nozzle 28. Mounted to be able to close off the nozzle 28, in opposition thereto is a choke 29 supported by a resilient diaphragm. The said diaphragm, together with the choke 29 acts as the resilient wall of a closed chamber 30 fluid-pressure connected with the output of the manometric instrument 2 under testing. Disposed to the opposite sides of the choke-diaphragm assembly 29 and acting thereupon are two compression springs 31 and 32.

The electrical part of the input generator 1 includes the above-mentioned electrically connected limit switches 18 and 19, a timer relay 33 including contacts 34, an electromagnet hold relay 35 including contacts 36, a manually operated selector switch 37, a control push-button 38 and the solenoids of the two abovementioned solenoid-operated valves 24 and 25.

In FIGS. 1 and 2, short arrow lines indicated with "P" illustrate the supply of pressurized air (the pressure P preferably being equal to 1.4 kg/sq.cm) from an external source (not shown) of pressurized air, whereas the short arrow line indicated with "Q" indicate the supply of pressurized air also from an external pressure source, the pressure "Q" being intended for the creation of the input air pressure of the generator 1 and being equal to no less than double value of the uppermost input pressure of the manometric instrument 2 under testing.

The operation of the herein disclosed apparatus for testing manometric instruments is, as follows.

When the input signal of the manometric instrument 2 under testing is equal to "zero", the limit switch 18 is operated, as it has been described above.

The push-button control 38 (FIG. 2) is operated, whereby the solenoid of the solenoid-operated valve 24 and the electromagnet hold relay 35 are energized. Consequently, the air pressure at the input of the manometric instrument 2 under testing starts rising. The output signal of the manometric instrument 2 under testing is recorded on the movable record tape (not shown in the drawings) by the stylus 20 of the secondary double-channel recording instrument 13, in the form of a curve 39 illustrated in FIG. 3, where the X-axis is calibrated in minutes of time ($t$), and the Y-axis is calibrated in the values of the percentage of the output pressure P of the manometric instrument 2 under testing. The portion of the curve 39 intermediate of the points 40 and 41 corresponds to the variation of the uppermost values thereof.

When the push-button control 38 is released, the energization circuit of the solenoid of the valve 24 through the push-button is broken, but the energization of this solenoid is continued through the now closed contacts 36 of the electromagnet hold relay 35.

Should the transformation factor (see above) of the manometric instrument 2 under testing deviate from the transformation factor reproduced by the herein disclosed apparatus, the balance arm 5 (FIG. 1) would be displaced from the zero position thereof, the displacement being representative of the error of the manometric instrument 2 under testing. The displacement brings about a variation of the pressure in the nozzle 11, proportional to the error of the instrument 2. A pressure signal carrying information about the variation of the pressure of air in the pneumatic amplifier 14 is sent from the output of the latter into the bellows 12 which, through the pivoted arm 15, acts upon the balanced arm 5 and thus compensates for the unbalancing torque applied thereto.

In this way there is effected positive pneumatic compensation for the effort proportional to the error of the manometric instrument under testing, whereby there is ensured a high degree of the accuracy of the testing.

Figure 3:
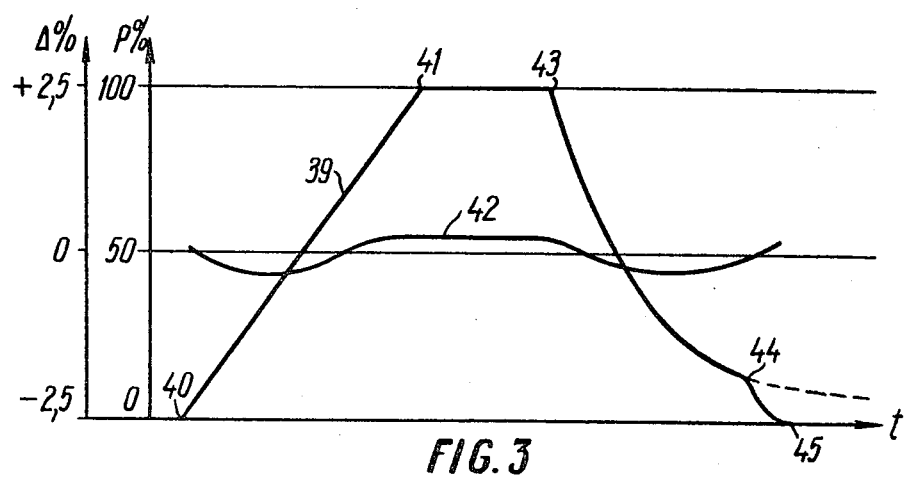
FIG. 3 illustrates graphs, or diagrams of the variation of the output signal of the manometric instrument under testing manometric instruments, constructed in accordance with the invention.

The value of the error of the manometric instrument 2 under testing is recorded by the second channel of the secondary double-channel recording instrument 13, in the form of a curve 42 also illustrated in FIG. 3 where, in this case, the Y-axis represents the error Δ of the instrument 2, in the per cent form.

The curves 39 and 42 are recorded simultaneously, and, therefore, any given value of the output pressure of the manometric instrument 2 and the corresponding value of the error of this instrument are related to the same moment of time.

The rate of the rising of the output pressure of the manometric instrument 2 is adjustable by means of the throttle valve 23 (FIG. 2). When the value of the output signal of the manometric instrument 2 under testing reaches 100 percent (the point 41 in FIG. 3), the limit switch 19 (FIG. 2) breaks the energization circuit of the solenoid of the solenoid-operated valve 24 and of the electromagnet hold relay 35; simultaneously, the timer relay 33 is energized. The solenoid-operated valve 24 is thus closed, and, if the instrument under testing is hermetically sealed, i.e., leak-proof, there would be recorded on the record tape a portion of the curve 39 between the points 41 and 43, parallel to the X-axis.

After a time delay pre-set by the timer relay 33 (FIG. 2), the latter closes its contacts 34, and the solenoid of the solenoid-operated valve 25 is energized. In this way the stage of testing the manometric instrument 2 at diminishing input pressure opens. The rate of the diminishing of the input pressure is adjustable by means of the throttle valve 26. When the input pressure of the generator 1 drops to 20 – 15 per cent the variation range thereof, and, consequently, the pressure inside the closed chamber 30 drops accordingly, the compression spring 32 disposed on the side of the nozzle 28 opens the choke 29, for the air to bleed into the ambient atmosphere via the adjustable throttle valve 27 (the point 44 of the curve 39 represents the moment of the opening of the choke 29). Upon the output signal of the manometric instrument 2 reaching the "zero" value (the point 45 of the curve 39), the limit switch 18 (FIG. 2) deenergizes the solenoid of the valve 25 and thus closes the latter. Thus the first cycle of the operation of the testing of the manometric instrument 2 is completed, and the testing is discontinued, if the manually operated selector switch is in its "A" position.

When the selector switch 37 is set to the "B" position thereof, the operation of the testing of the manometric instrument 2 is repeated each time the output signal of the instrument 2 reaches its "zero" value (the point 45 of the curve 39 in FIG. 3), i.e., in this case the testing is performed as a succession of complete testing cycles.

The present apparatus for testing manometric instruments with an air-pressure output signal ensures that the testing can be effected with the testing error not in excess of 0.1 percent; moreover, the apparatus increases the efficiency of the testing operator's work since a single operator is perfectly able to operate eight to 10 such apparatus simultaneously. The outcome of the testing is presented directly in the form of the diagram of the error of the instrument under testing, whereby it becomes possible to detect the hidden flaws of manometric instruments and thus to ensure manufacture and marketing of such instruments of the highest quality only. The herein disclosed apparatus does not involve the use of mercury-filled manometric gauges, and thus improves the sanitary conditions within the testing premises. The use of apparatus constructed in accordance with the invention becomes particularly profitable in cases when relatively great quantities of manometric instruments are to be tested and gauged.

What is claimed is:

1. An apparatus for testing fluid pressure relays with an air-pressure output signal in a response to an air pressure input signal, comprising: a generator of input pressure variable according to a pre-determined pattern, pneumatically connected with the manometric instrument under testing for supplying air-pressure signals thereto and receiving air-pressure signals therefrom; a first pressure-responsive member pneumatically connected with said generator of input pressure for supplying air-pressure signals to said pressure-responsive member; a balanced pivoted arm operatively associated with said first pressure-responsive member; a second pressure-responsive member operatively associated with said balanced arm and pneumatically connected with said manometric instrument under testing for receiving the output air-pressure signal from said instrument; an indicator of the position of said balanced arm, responsive to the deviations of said balanced arm from its zero position, such deviations being representative of the value of an error of said manometric instrument under testing; a movable member of said indicator of the position of said balanced arm, carried by said balanced arm; a stationary member of said indicator of the position of said balanced arm, mounted in opposition to said movable member; a power output member pneumatically connected to said indicator of the position of said balanced arm; a pivoted arm operatively associated with said power member and with said balanced arm; a secondary double-channel recording device having the first channel thereof pneumatically connected with said indicator of the position of said balanced arm, for recording the output air-pressure signal coming from said indicator and being representative of the value of an error of said manometric instrument under testing, the second channel of said recording device being pneumatically connected with said instrument under testing, for recording the air-pressure output signals of said instrument; an air-pressure supply source connected to supply pressurized air, respectively, to said input pressure generator, to said indicator of the position of said balanced arm, to said manometric instrument under testing and to said secondary double-channel recording device.

2. An apparatus as of claim 1, wherein said movable member of said indicator of the position of said balanced arm is in the form of choke, and said stationary member of said indicator is in the form of a fluid jet nozzle.

3. An apparatus as of claims 1 and 2, wherein said power output member is in the form of a bellows.

* * * * *